June 6, 1939. A. R. BERMAN 2,161,003

COMPOSITE LUBRICATION SEAL

Original Filed April 12, 1937 2 Sheets-Sheet 1

AARON R. BERMAN

*INVENTOR*

BY Joseph Blacker

*ATTORNEY*

June 6, 1939.  A. R. BERMAN  2,161,003
COMPOSITE LUBRICATION SEAL
Original Filed April 12, 1937  2 Sheets-Sheet 2
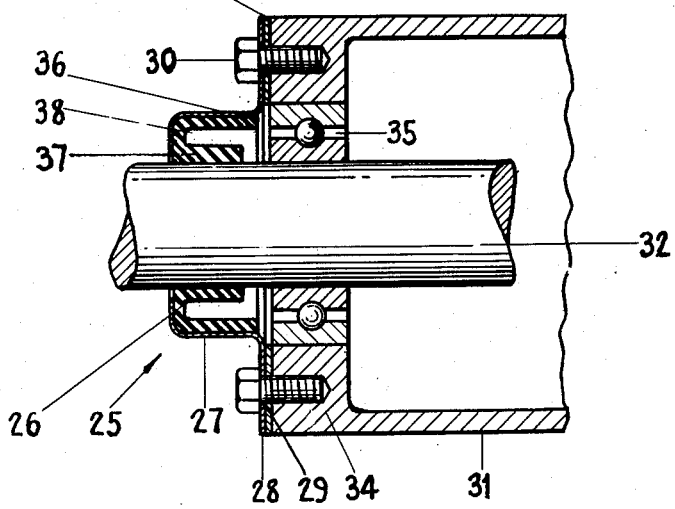
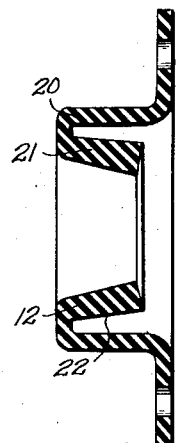
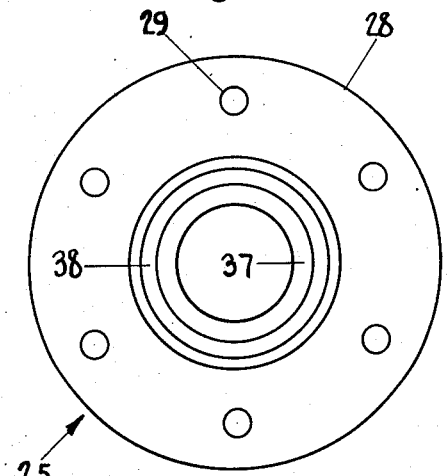
AARON R. BERMAN
*INVENTOR.*
BY *Joseph Blacker*
ATTORNEY Patented June 6, 1939

2,161,003

UNITED STATES PATENT OFFICE 2,161,003

COMPOSITE LUBRICATION SEAL

Aaron R. Berman, Brooklyn, N. Y.

Application April 12, 1937, Serial No. 136,396
Renewed November 1, 1938

2 Claims. (Cl. 286—5)

This invention relates to composite sealing devices and particularly to novel means associated with rotating shafts for preventing leakage of lubricating oil or grease through the shaft openings in housings which are filled with a lubricating medium through which the rotating shafts project.

Rotating rear axle and propelling shafts for vehicles, etc. are mounted in housings which are fluid tight but have shaft openings which must be sealed against leakage of lubricating fluid contained in the housing.

Compressed packings employed for sealing rotating shafts present considerable resistance which result in the ultimate scoring of the shafts and the development of leaks between the sealing means and the rotating shaft.

An object of this invention is to provide a fluid seal for rotating shafts comprising inherently resilient means compounded so as not to be subject to the deteriorative action by contact with the lubricating fluids to be sealed.

Another object of this invention is to provide a composite fluid seal for rotating shafts which can be manufactured at a relatively low cost, which is easy to install and compact and which is not subject to excessive wear by frictional contact.

Another object of this invention is to provide a composite sealing device which may be employed either when the shaft revolves in a stationary housing or when a stationary shaft is mounted in a rotating housing.

Another object of this invention is to provide a composite lubrication seal comprising an inherently yieldable annulus designed to be deformable radially while maintaining sealing engagement with a revolving shaft.

With the above and other objects in view, the invention will be hereinafter more particularly described and the combination and arrangement of parts will be shown in the accompanying drawings and pointed out in the claims which form part of this specification.

Reference will now be had to the drawings, wherein like numerals of reference designate corresponding parts throughout the several views, in which:

Figure 3 is a fragmentary vertical sectional view of an axle housing bearing structure and associated shaft, equipped with a modified sealing device wherein an inherently yieldable sealing member having a radially movable annulus is integral with an outer annulus vulcanized inside a housing.

Figure 4 is an inner face view of the modified form of lubricant seal 25 shown in Figure 3.

Figure 5 is a sectional view of the resilient sealing member 12.

Figure 1:
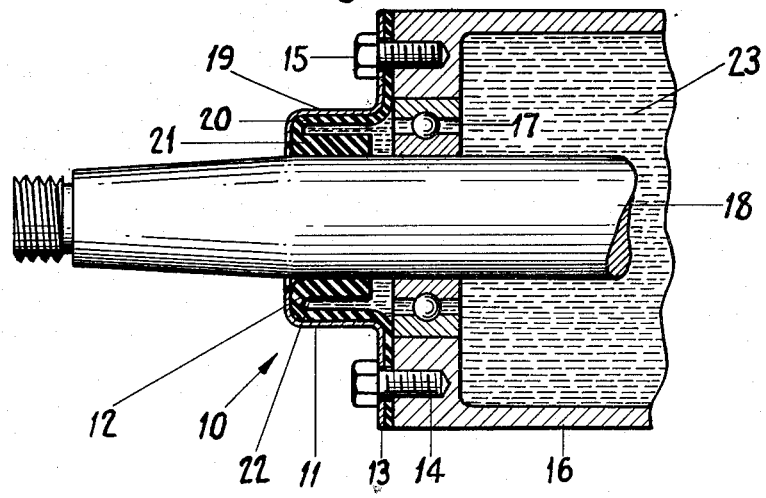
Figure 1 is a fragmentary central vertical sectional view of an axle housing bearing structure and associated shaft, equipped with a composite lubrication sealing device which is representative of one embodiment of my invention wherein the seal comprises an integral flange.
Figure 2:
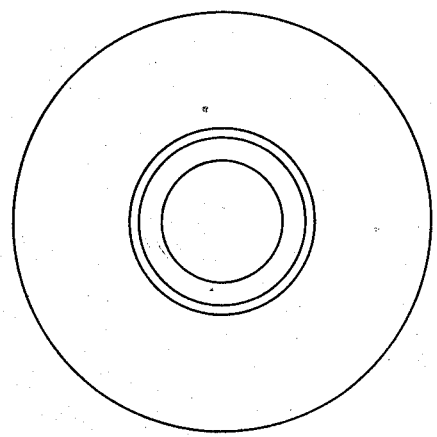
Figure 2 is an inner face view of the resilient sealing member 12.

In the illustrated embodiment of the invention, the numeral 10 identifies a composite lubricating seal comprising a metallic housing member 11 and an inherently resilient sealing member 12. The resilient sealing member 12 is made of synthetic rubber so compounded as to resist swelling when in contact with lubricating fluids. The sealing member is molded and bonded in permanent intimate union with the seal housing 11 so that there is eliminated the possibility of leakage of the lubricating fluid between the contacting surfaces of the members 11 and 12.

The housing member 11 has a flange 13, preferably of circular form and having apertures 14 to receive bolts 15 whereby the seal housing 11 may be secured to an axle housing 16 provided with a bearing 17 through which extends a vehicle axle shaft 18. The seal housing 11 includes a sleeve 19 into which an annular portion 20 of the sealing member is molded.

The sealing member 12 has an integral sealing annulus 21 extending centrally in spaced relation from the annular portion 20 and forming an annular recess 22, to permit said annulus to breathe radially concomitantly with the revolving shaft 18. It is to be noted that the internal diameter of the annulus is smaller than that of the shaft 18 so as to forcibly and resiliently contact the shaft in sealing relation; under practical operating conditions the rotating shaft 18 may not be perfectly centrally mounted and the revolving shaft causes continuous displacement of the annulus in radial directions.

The lubricating fluid 23 in the housing 16 may enter under pressure into the space 22 between the inner and outer annular portions 20 and 21 and cause an augmented radial pressure to be exerted by the annulus 21 against the shaft 18. The area of contact between the annulus 12 and the surface of the shaft 18 may be made very small to minimize friction and still form a fluid-tight seal.

Figure 3 shows a modified lubricant seal 25 comprising an inherently resilient sealing member 26 and a metallic housing member 27.

The housing member 27 has a flange 28 having apertures 29 to receive bolts 30 whereby the seal housing 27 may be secured to an axle housing 31 provided with a bearing 35 through which extends a shaft 32. A gasket 33 has been placed between the flange 28 and the hub 34 of the housing 31 to secure fluid tightness therebetween. The seal housing 27 includes a sleeve 36 into which the sealing member 26 is molded and caused to adhere thereto by vulcanization.

The sealing member 26 has an integral sealing annulus 37 extending centrally in spaced relation and forming an annular recess 38, to permit the annulus to breathe or to be deformable radially concurrently with the revolving shaft 32. The internal diameter of the annulus 37 is smaller than that of the shaft 32 so as to forcibly and resiliently contact the shaft in sealing relation under practical operating conditions.

It is to be noted that the synthetic rubber used for forming the resilient sealing members herein described is compounded to limit the expansion to almost negligible proportions and adhered directly to the metallic housing member. It is to be understood that the surface adhesion between the inherently resilient sealing material and the metal housing is sufficient to permanently retain the said members in parmanent intimate union without any mechanical connecting means.

Referring to the drawings, it will be seen that the lubricant can pass through the bearing into the annular recess in the sealing member and that when the lubricant is under pressure, the pressure in the recess will press radially against the fixed outer circular portion of the sealing member and simultaneously press radially against the yieldable inner circular portion and cause said inner portion to frictionally engage the shaft in sealing relation. Under actual operating conditions, when the shaft is slightly out of line and the inner annulus is deformed, the inherent resiliency of the sealing material constantly reforms the annulus to its original shape.

The cross-sectional design of the U-shaped yieldable sealing member is such as to provide a frictional drive between a rotating shaft and the lubrication seal which avoids destructive frictional engagement.

While I have shown two embodiments of my improved sealing device wherein rotatable shafts are sealed while mounted in stationary housings and one embodiment where a stationary shaft is in operative relation with a revolving housing such as are used in automobile front axles and in industrial applications it is to be understood that I may apply the invention for other sealing purposes to provide a frictional drive between rotary members without destructive frictional engagement. As shown in Figure 5, the resilient sealing member 12, at the time of vulcanization in housing member or shell plate 11 the sealing annulus 21 has its inner diameter tapered and furthermore, its inner diameter near its free end is smaller than the diameter of the shaft 18, so that when the sealing member 12 is fitted on the shaft 18 the sealing annulus 21 becomes deformed, so that said annulus 21 will assume the shape shown in Figure 1. Also the outer diameter of the annulus 21 is slightly tapered and is smaller at its inner free end as shown in Figure 5. As previously stated, the wall of the annulus 21 is thicker than the outer cylindrical wall of the resilient sealing member 12, and owing to this particular construction of the annulus 21 it becomes deformed when fitted on the shaft 18, and due to this construction and the smallness of the diameters the sealing annulus 12 will hug and wipe against the shaft, and therefore result in a breathing action within the space between the resilient annulus 21 and the outer wall of the sealing member 12. In other words, if there be any movement of the shaft 18 radially relative to the axle housing 16 such breathing action takes place. Furthermore, as a result of such movement of the shaft 18 radially relative to the housing 16 the wall of the resilient annulus 21 will become more deformed on one side than the opposite side, which will insure said breathing action, and thereby causing the annulus 21 to constantly hug and wipe against the shaft 18, thereby preventing escape of the lubricant.

What I claim is:

1. The combination with a revoluble shaft passing through the wall of a casing, of a fluid sealing device therefor, a shell plate having a cylindrical cavity co-axial with the shaft, and provided with a radial flange secured to the casing, an annular resilient compound sealing element of synthetic rubber conforming to and bonded adhesively to the inner surface of said shell plate, said cylindrical portion merging into a reversely turned flexible resilient flange spaced from the inner surface of said cylindrical portion and surroundingly hugging and wiping against the surface of said shaft, said flexible resilient flange being of greater thickness than that portion of the sealing element which engages the inner surface of the cavity, and being of smaller diameter at its free end than the shaft and due to said greater thickness a deformity of the flange takes place when fitting said sealing element over the shaft thereby causing the resilient flange to huggingly wipe against the shaft setting up a breathing action and preventing escape of the fluid, said deformed portion of the resilient flange extending toward the fluid in said casing and tending toward a torsional action with the shaft to prevent the fluid escaping from said casing.

2. The combination with a revoluble shaft passing through the wall of a casing, of a fluid sealing device therefor, a shell plate having a cylindrical cavity co-axial with the shaft and provided with a radial flange secured to the casing, an annular resilient compound sealing element of synthetic rubber conforming to and bonded adhesively to the inner surface of said cavity and extending bondingly over said radial flange, said cylindrical portion merging into a reversely turned flexible resilient flange spaced from the inner surface of said cylindrical portion and surroundingly hugging and wiping against the surface of said shaft, said flexible resilient flange being of greater thickness than that portion of the sealing element which engages the inner surface of the cavity, and being of smaller diameter at its free end than the shaft and due to said greater thickness a deformity of the flange takes place when fitting said sealing element over the shaft thereby causing the resilient flange to huggingly wipe against the shaft setting up a breathing action and preventing escape of the fluid, said deformed portion of the resilient flange extending toward the fluid in said casing and tending toward a torsional action with the shaft to prevent the fluid escaping from said casing.

AARON R. BERMAN.